United States Patent
Moon et al.

(10) Patent No.: US 6,418,309 B1
(45) Date of Patent: *Jul. 9, 2002

(54) APPARATUS AND METHOD FOR CONFIGURING SETTINGS OF A PORTABLE INTELLIGENT COMMUNICATIONS DEVICE DURING A MEETING

(75) Inventors: Billy G. Moon, Apex; Nils Rydbeck; Manon Baratt, both of Cary, all of NC (US)

(73) Assignee: Ericsson Inc., Reasearch Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/955,913

(22) Filed: Oct. 22, 1997

(51) Int. Cl.$^7$ ................................. H04M 3/42
(52) U.S. Cl. ................. 455/418; 455/556; 455/566; 455/567
(58) Field of Search .................... 455/418, 417, 455/38.2, 38.4, 66, 550, 556, 557, 566, 567, 90, 95, 344, 351; 379/373

(56) References Cited

U.S. PATENT DOCUMENTS

| | | | | |
|---|---|---|---|---|
| 5,128,981 A | * | 7/1992 | Tsukamoto et al. | 455/567 |
| 5,715,524 A | * | 2/1998 | Jambhekar et al. | 455/90 |
| 5,903,832 A | * | 5/1999 | Seppanen et al. | 455/414 |

FOREIGN PATENT DOCUMENTS

| | | |
|---|---|---|
| EP | 0 358 301 A2 | 3/1990 |
| EP | 0 711 089 A2 | 5/1996 |
| WO | WO 95/29568 | 11/1995 |

\* cited by examiner

*Primary Examiner*—Lee Nguyen
(74) *Attorney, Agent, or Firm*—Coats & Bennett, P.L.L.C.

(57) ABSTRACT

An apparatus and method for activating an operational mode for a portable intelligent communications device when a user thereof is engaged in a meeting. The operational mode includes various settings of the portable intelligent communications device configured therefor with such settings being activated upon initiation of the meeting. The operational mode is then deactivated upon completion of the meeting. Both activation and deactivation of the operational mode may be accomplished either automatically or manually. In either case, the settings for the operational mode are configured via a graphical user interface on a display screen of the portable intelligent communications device.

12 Claims, 8 Drawing Sheets

APPARATUS AND METHOD FOR CONFIGURING SETTINGS OF A PORTABLE INTELLIGENT COMMUNICATIONS DEVICE DURING A MEETING

BACKGROUND OF THE INVENTION

1. Field of the Invention

The present invention relates generally to a portable intelligent communications device and, more particularly, to an apparatus and method for configuring certain settings of such portable intelligent communications device during a meeting.

2. Description of Related Art

A new class of communication devices has been developed which includes a full computer integrated with the communications hardware and software. These devices, known as portable intelligent communications devices, differ significantly from personal digital assistants (PDAs) and handheld personal computers (HPCs) in that they are designed extensively to be a communications device rather than merely a "mobile computer." As such, the top features for the communications device are telephony, enhanced telephony, messaging, and information services. In order to enable at least some of these features, the portable intelligent communications device is able to be connected to the Internet by either a wired link or a wireless link. It will also be understood that certain software applications are provided within the portable intelligent communications device to facilitate the aforementioned features, as well as other desirable features such as a Personal Information Manager (PIM), games, and the like. An exemplary portable intelligent communications device is shown and disclosed in a patent application entitled "Switching Of Analog Signals In Mobile Computing Devices" and having Ser. No. 08/796,119, which is owned by the assignee of the present invention and is hereby incorporated by reference.

It will be understood that the aforementioned portable intelligent communications device is targeted to the traveling business person. Since this type of user will constantly be engaged in meetings and other activities during which normal operation of the portable intelligent communications device would be awkward or inappropriate, it is desirable for the portable intelligent communications device to activate an operational mode consistent therewith. This would involve configuring a series of settings for the portable intelligent communications device which, for example, handle and/or divert incoming communications, disable alarms, and the like. To the extent such operational modes have been available in the past, they have been enabled and disabled manually. This has been problematic in some instances since incoming communications are missed when the user fails to manually deactivate the mode after the meeting or activity is completed. Therefore, it would be highly desirable for an operational mode to be developed for a communications device in which certain configuration settings are automatically activated and deactivated. It would also be advantageous for such an operational mode to permit manual activation and deactivation through a graphical user interface which is easy to use.

Accordingly, a primary object of the present invention is to provide an apparatus and method for activating and deactivating an operational mode for a portable intelligent communications device when the user thereof is engaged in and completes a meeting or other similar activity, respectively.

It is another object of the present invention to provide an apparatus and method for automatically activating and deactivating an operational mode for a portable intelligent communications device when the user thereof is engaged in and completes a meeting or other similar activity, respectively.

It is still another object of the present invention to provide an apparatus and method for configuring certain settings of a portable intelligent communications device upon activation of a particular operational mode utilized when the user is engaged in a meeting or other similar activity.

Yet another object of the present invention is to provide an apparatus and method for automatically configuring certain settings of a portable intelligent communications device upon activation of a particular operational mode utilized when the user is engaged in a meeting or other similar activity.

Still another object of the present invention is to provide an apparatus and method for automatically reconfiguring certain settings of a portable intelligent communications device upon deactivation of a particular operational mode when the user has concluded a meeting or other similar activity.

Another object of the present invention is to provide an apparatus and method for manually activating an operational mode for a portable intelligent communications device which utilizes a graphical user interface for configuring certain settings when the user is engaged in a meeting or other similar activity.

These objects and other features of the present invention will become more readily apparent upon reference to the following description when taken in conjunction with the following drawings.

SUMMARY OF THE INVENTION

In accordance with a first aspect of the present invention, a method of activating an operational mode for a portable intelligent communications device when a user thereof is engaged in a meeting or other similar activity is disclosed. This method includes the steps of configuring various settings of the portable intelligent communications device which are associated with the operational mode and activating the operational mode for the portable intelligent communications device upon initiation of the meeting. The method may also include the step of deactivating the operational mode upon completion of the meeting. The activating and deactivating steps may be accomplished automatically or manually, with the settings being configured via a graphical user interface either prior to or after activation of the operational mode.

In accordance with a second aspect of the present invention, a portable intelligent communications device is disclosed as including circuitry for performing telephony operations, a processing circuit, a display screen coupled to the processing circuit, and a graphical user interface for configuring a plurality of settings associated with a mode of operation for the portable intelligent communications device when the user thereof is engaged in a meeting or other similar activity. The processing circuit is operable to activate and deactivate the settings of the operational mode, which may be accomplished either automatically or manually via a graphical user interface shown on the display screen.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
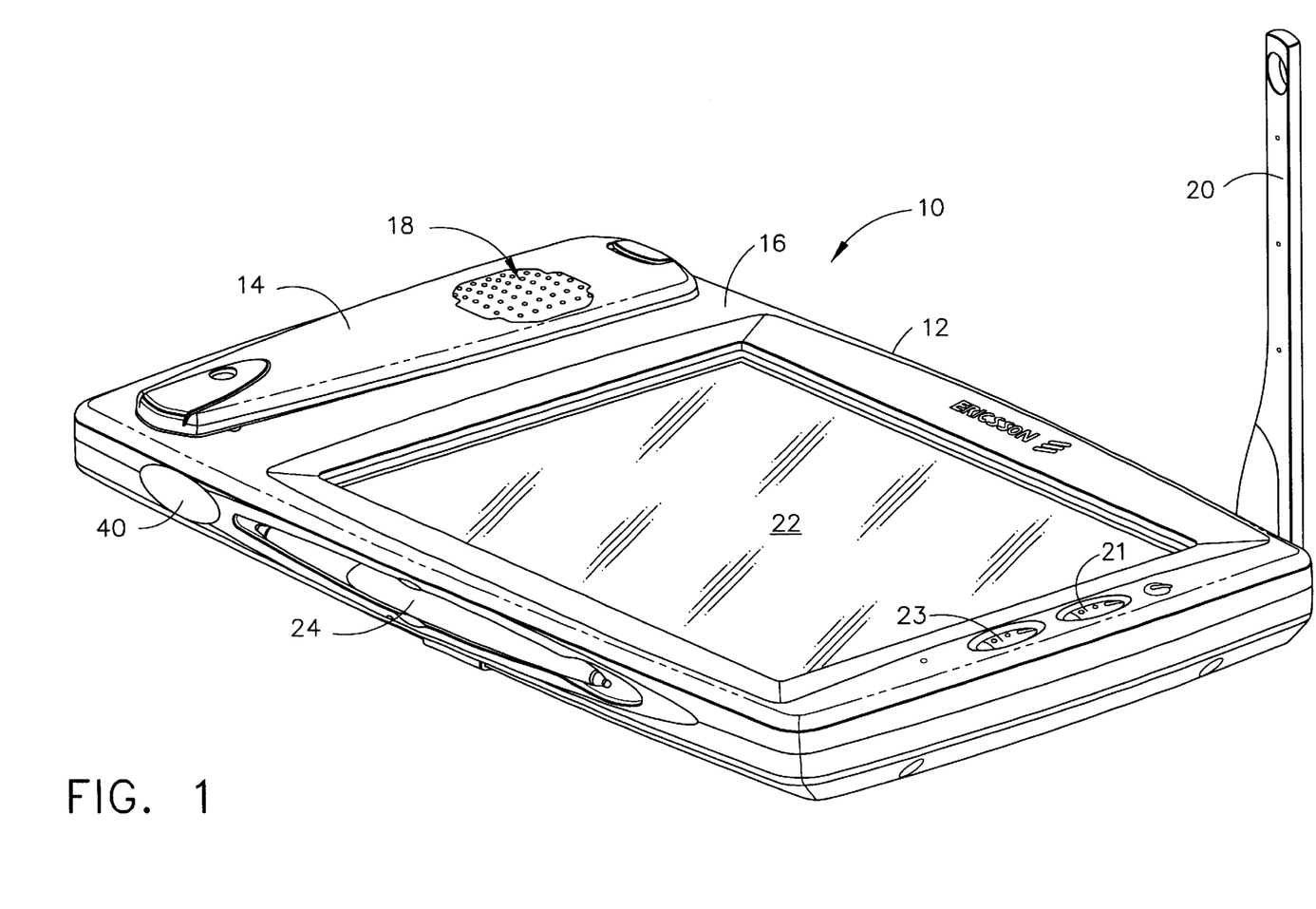
FIG. 1 is a perspective view of a portable intelligent communications device having an operational mode for meetings or other similar activities in accordance with the present invention.

Referring now to the drawings in detail, wherein identical numerals indicate the same elements throughout the figures, FIG. 1 depicts a portable intelligent communications device identified generally by the numeral 10. It will be understood that portable intelligent communications device 10 is principally a communications device and includes circuitry and components which allows it to function in such capacity through cellular, landline, infrared data association (IrDA), phone cards, and other modes. Portable intelligent communications device 10 also includes circuitry which enables it to function in the capacity of a computer and a plurality of software applications may be utilized therewith. Because of this combination, portable intelligent communications device 10 is uniquely suited to interface software applications with the communications hardware and software. In this regard, it will be understood that portable intelligent communications device 10 generally operates in accordance with a device shown and described in a patent application entitled "Switching Of Analog Signals In Mobile Computing Devices" and having Ser. No. 08/796,119, which is also owned by the assignee of the present invention and is hereby incorporated by reference.

As seen in FIG. 1, portable intelligent communications device 10 includes a casing 12 for housing the communications and other circuitry as will be discussed in greater detail hereinafter. A handset 14 is positioned within a top portion 16 of casing 12 and preferably includes a built-in speaker 18 for use when handset 14 is maintained there. A pivotable antenna 20 (shown in FIG. 1 in the open or use position) is provided to enable communications function, as when in the cellular mode. It will be understood that various ports, jacks, and interfaces will be provided to further enable communications. Control buttons 21 and 23 are also shown as being located on top portion 16 of casing 12.

Portable intelligent communications device 10 further includes a display screen 22, which preferably is a type in which a user of the device is able to interact through touching designated areas thereon. It will be appreciated that a stylus 24 may optionally be utilized to indicate a particular area more specifically than can be accomplished with the user's finger, although most designated areas are sized for touch interaction by a typically sized finger. Since portable intelligent communications device 10 preferably is no larger than a standard business desk telephone, display screen 22 is sized to be approximately eight (8) inches measured diagonally across. This puts screen display 22 in a distinct size class, as it is smaller than normal monitor sizes for personal and portable computers and larger than screen displays for personal digital assistants (PDAs), calculators, and other similar personal electronic devices.

Figure 2:
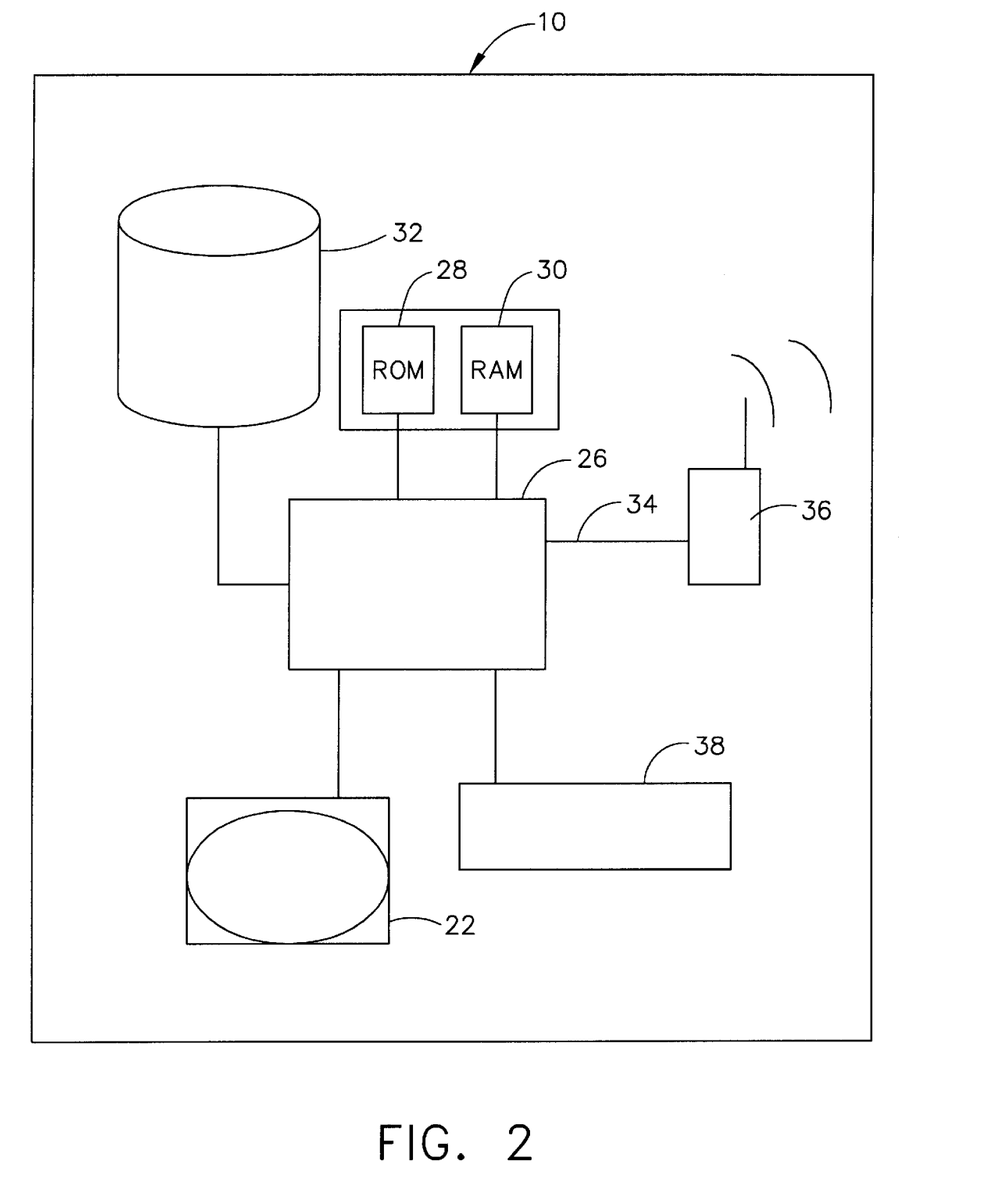
FIG. 2 is a simplified high level block diagram of the portable intelligent communications device depicted in FIG. 1.

Turning to FIG. 2, the internal circuitry of portable intelligent communications device 10 includes a processing circuit 26, which may, for example, be a Motorola microprocessor known by the designation Power PC 821. It will be seen that processing circuit 26 is connected to both Read Only Memory (ROM) 28 and Random Access Memory (RAM) 30 in which both operating systems and software applications are stored. An optional bulk storage device 32 is further provided for storing databases. Processing circuit 26 is also coupled to display screen 22 through a standard driver (not shown) in order to control the images displayed thereon, as well as receive information through graphical user interfaces in which the user of portable intelligent communications device 10 may indicate chosen options. The communications functions of portable intelligent communications device 10 are also handled through processing circuit 26 via a serial and/or parallel port 34 to the particular circuitry of a communications mode designated generically by reference numeral 36. As noted hereinabove, there are several communication mode options available, including cellular, landline, IrDA, and phone cards, and it will be appreciated that more than one such option may be utilized at a given time. A keyboard 38 may also be connected to processing circuit 26, where keyboard 38 can be depicted on display screen 22 or be a separate physical package which can be utilized with portable intelligent communications device 10 such as through a keyboard IR port 40 (see FIG. 1).

Figure 3:
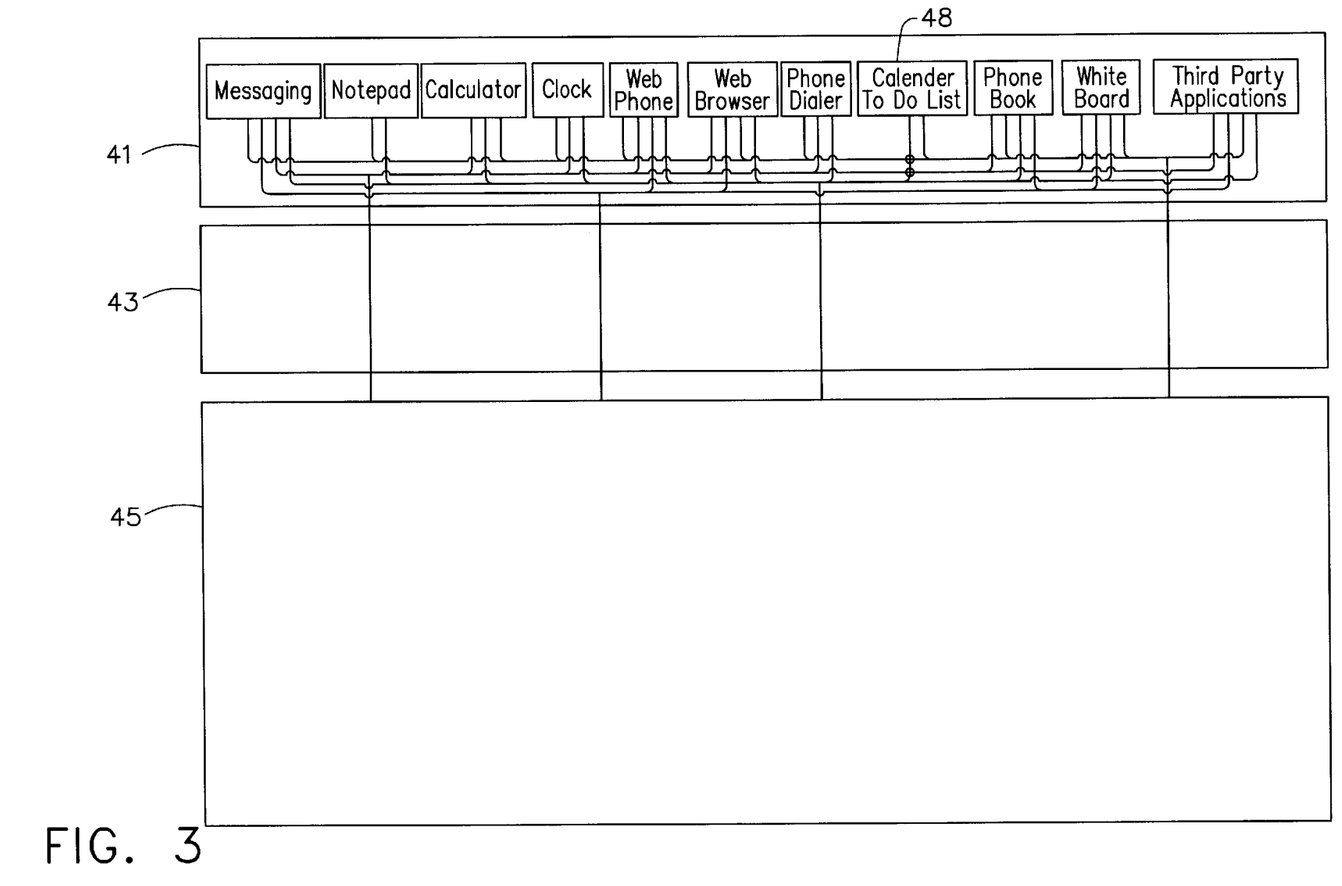
FIG. 3 is block diagram of the software architecture for the portable intelligent communications device depicted in FIGS. 1 and 2 which includes certain software applications in accordance with the present invention.

FIG. 3 depicts a schematic block diagram of the software architecture for portable intelligent communications device 10. As seen therein, the software is divided into three basic areas: applications software 41, desktop software 43, and system operating software 45 (which includes everything else from the class libraries down to the device drivers for portable intelligent communications device 10). It will be understood that neither applications software 41 nor desktop software 43 will ever interact with anything other than the top layer of system operating software 45. Exemplary software applications are shown within applications software 41, with particular reference being made to calendar/to do list software 48 in accordance with the present invention.

Figure 5A:
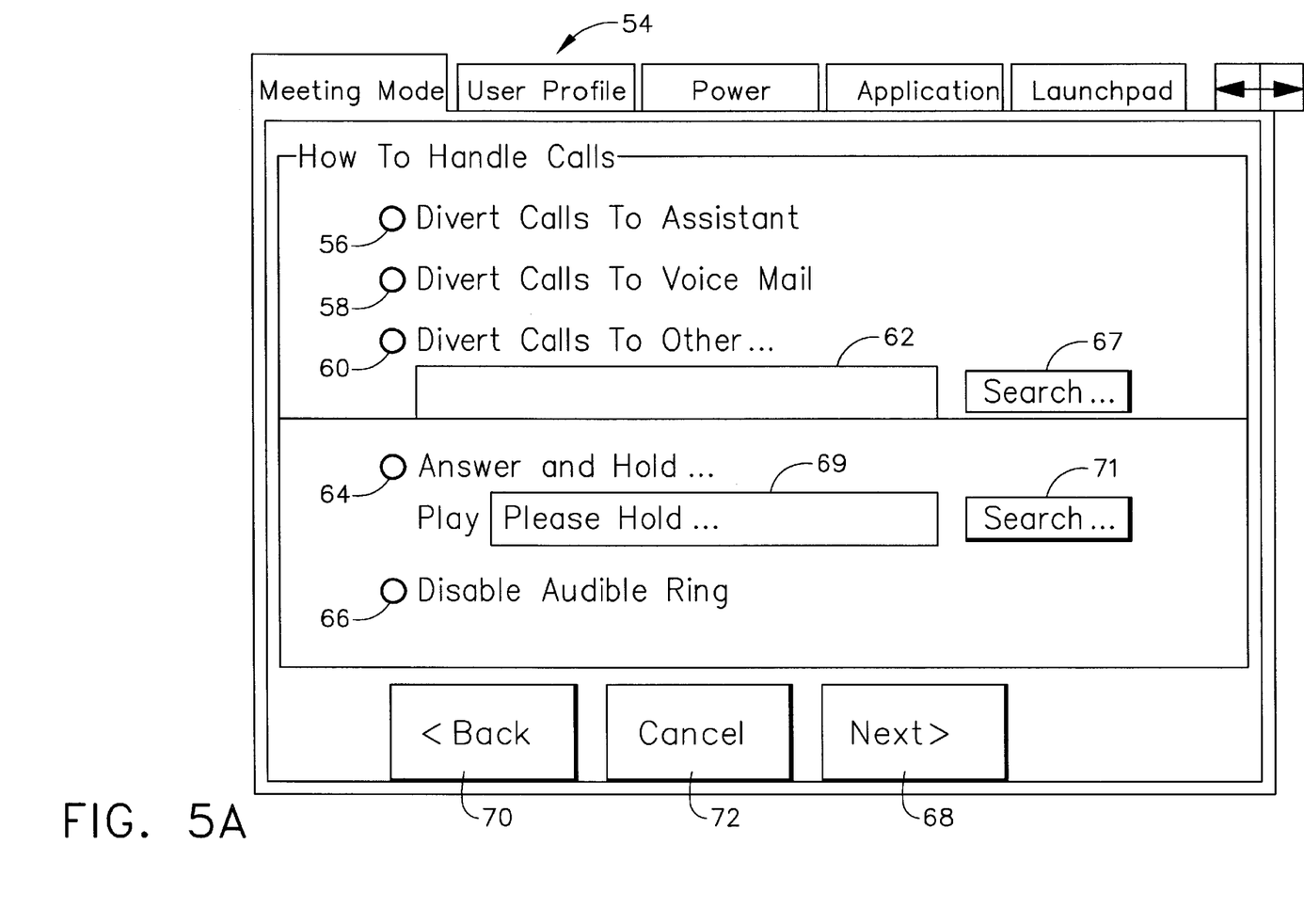
FIGS. 5A–C are a series of screen displays provided by a graphical user interface which are used to configure certain settings of the portable intelligent communications device in accordance with an operational mode utilized when a user thereof is engaged in a meeting or other similar activity.
Figure 5B:
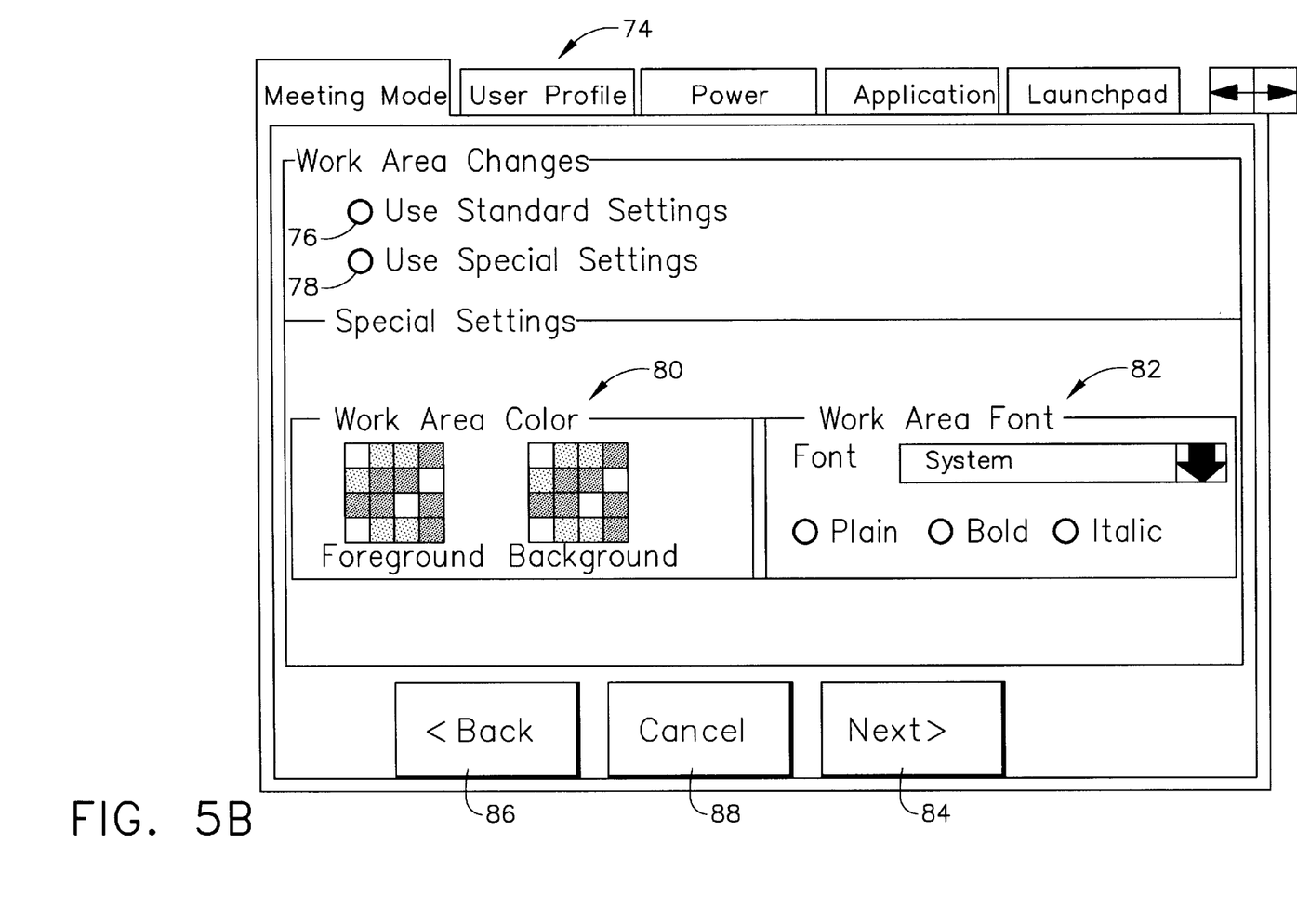
Figure 5C:
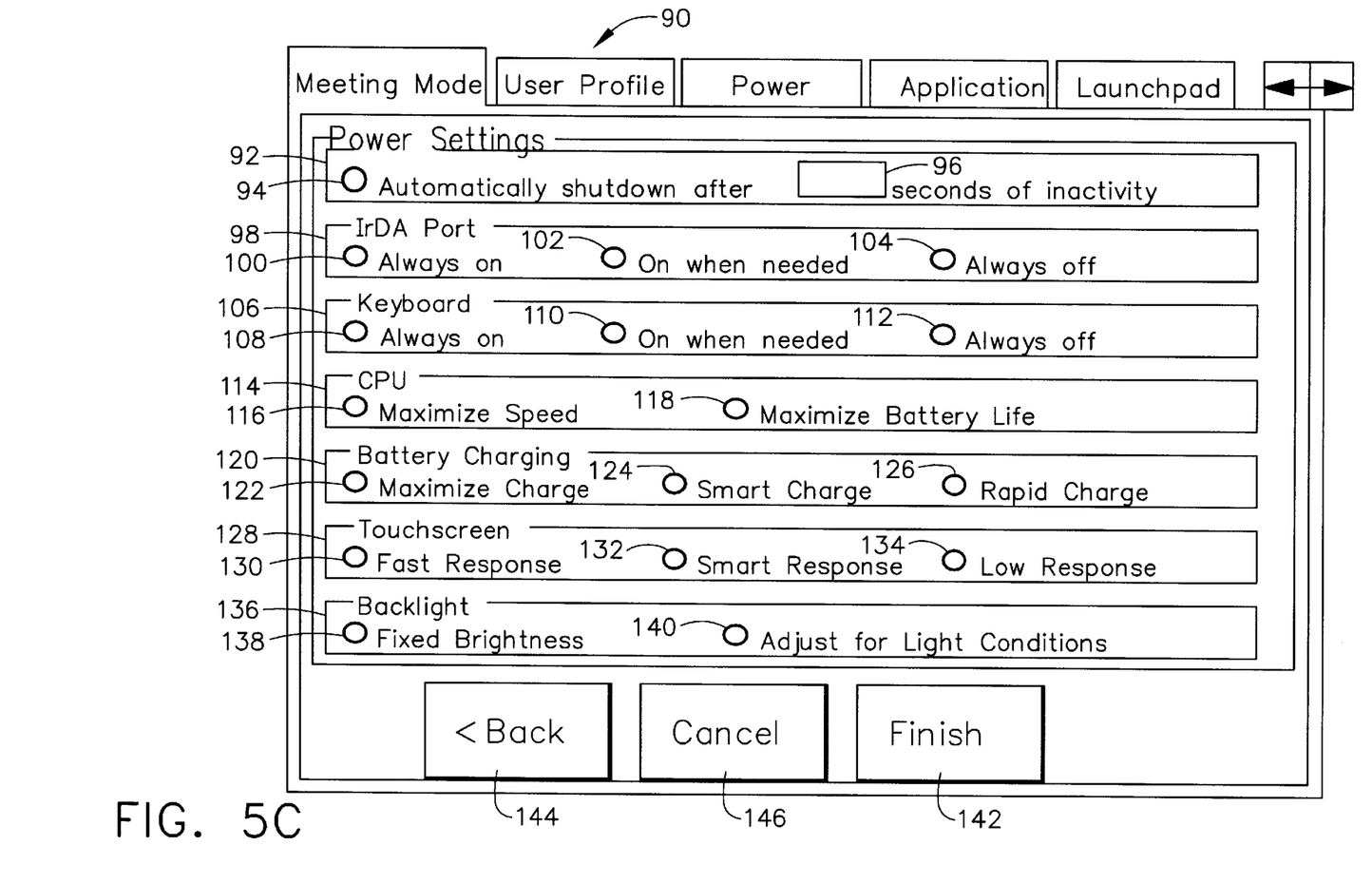

It will be appreciated that certain instances exist, such as during a meeting, when a user of portable intelligent communications device 10 would prefer that it be configured to operate differently than during normal conditions. In light of this preference, such an operational mode is provided in accordance with the present invention. This operational mode, also known as a meeting mode, involves various settings of portable intelligent communications device 10 being configured and associated with such operational mode so that they are implemented upon activation thereof (i.e., when a meeting or other similar activity is initiated). This operational mode for portable intelligent communications device 10 may be activated manually (e.g., through a graphical user interface) or automatically (e.g., through one of the software applications like calendar/to do list software application 48). The various settings of portable intelligent communications device 10 are organized under a designated file for the operational mode in a graphical user interface, as seen in FIGS. 5A–5C where separate screen displays are utilized to configure certain groups of settings. It will be understood that configuration of the settings may take place before or after manual activation of the operational mode, while configuration of these settings is preferably accomplished prior to automatic activation of such operational mode.

Likewise, deactivation of such operational mode may occur either manually or automatically upon completion of the meeting or other similar activity.

Figure 4:
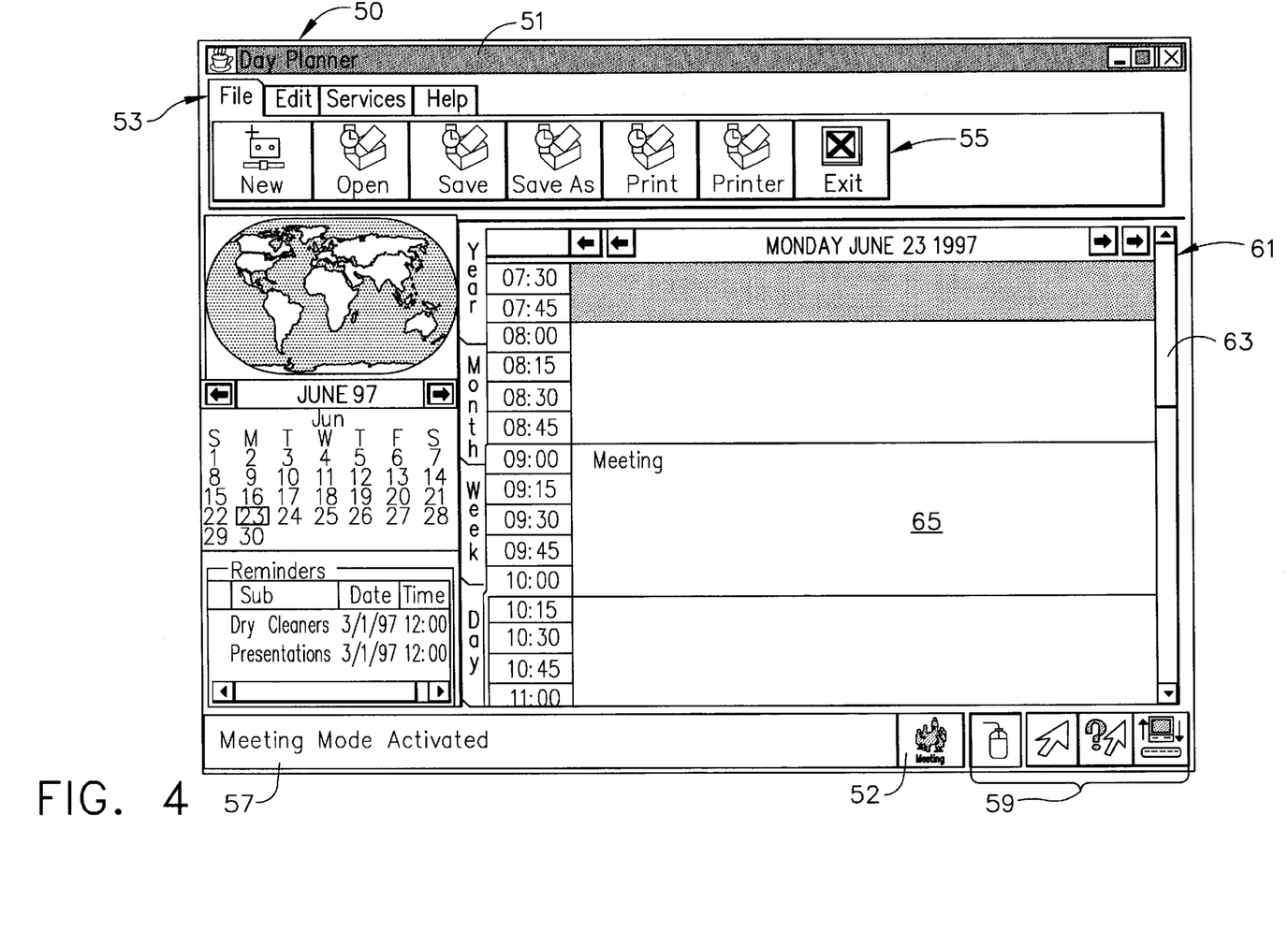
FIG. 4 is a screen display provided on the portable intelligent communications device of FIGS. 1 and 2 when operated in a calendar software application.

In order to permit better understanding of how the meeting mode can be implemented either manually or automatically, a screen display 50 for calendar/to do list software application 48 is shown in FIG. 4. It will be noted that screen display 50 includes a title bar 51 located in a top window, as well as standard control buttons located along the right-hand side of title bar 51.

A main control panel 53 is shown as including a plurality of tabbed areas, from which a second level of menu choices control buttons (identified collectively by the numeral 55), appear after selection of one of the tabs in main control panel 53. A bottom rectangular area 57 of screen display 50 is preferably used to display status information and may include one or more mouse-mode control buttons 59.

Figure 7:
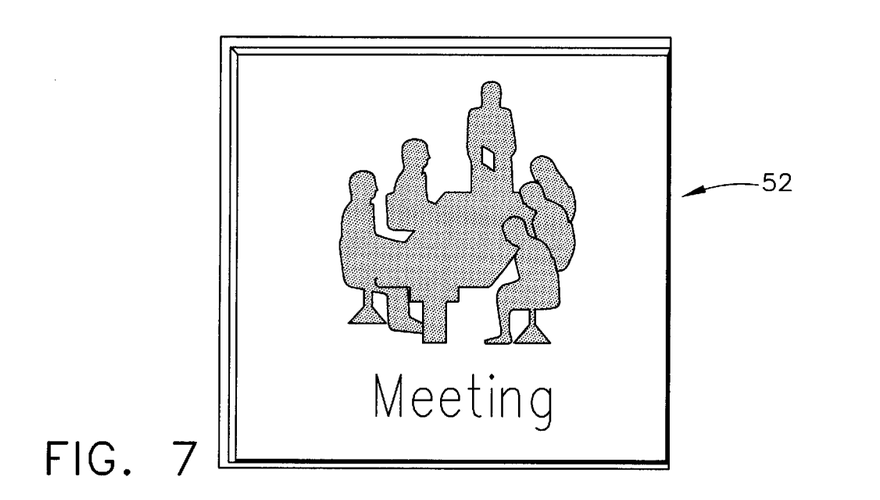
FIG. 7 is an enlarged view of the control button used to manually activate the operational mode of the portable intelligent communications device shown in FIG. 4.

It will further be noted that one of mouse-mode control buttons 59 is a meeting mode control button 52, which is seen best in FIG. 7. With respect to manual activation and deactivation of the meeting operational mode, control button 52 is pressed. Activation of control button 52 not only causes such control button to appear highlighted (or depressed), but a message also preferably appears within status bar 57 indicating that the meeting mode has been activated. Otherwise, control button 52 appears normally and no message is presented in status bar 57. It will be understood that control button 52 and the implementation of the meeting mode can be provided within a screen display for any of the software applications, as can the use of the status bar for presenting a corresponding message. This may be accomplished via a control drag and drop interface, for example, as shown and described in a patent application entitled "System To Associate Controls With Applications Using Drag And Drop Interface," Ser. No. 08/955,518, which is also owned by the assignee of the present invention and is hereby incorporated by reference.

With regard to automatic activation and deactivation of the operational mode, one example for accomplishing this task is to base it on appointments made in calendar/to do list software application 48 of portable intelligent communications device 10. As further seen in FIG. 4, appointments and/or meetings may be scheduled within a work area 61 of screen display 50 (having a vertical scroll bar 63), preferably for a designated time range (as denoted by a highlighted area 65 in work area 61). Of course, certain desirable information identifying a meeting or appointment may be included within highlighted area 65. Accordingly, the operational mode is activated upon initiation of such an appointment and then automatically deactivated upon conclusion thereof.

Turning to some of the exemplary settings which may be configured for the meeting mode, FIG. 5A depicts a screen display 54 for the handling of calls and other inbound communications to portable intelligent communications device 10, as well as alarms such as rings. It will be seen therein that an inbound call may be diverted to one of several alternative locations by means of filling bubble 56 (to an assistant), bubble 58 (voice mail), or bubble 60 (to some other location designated in box 62 or through a search button 67). Another alternative is to fill bubble 64, where the call is answered and the caller put on hold so that he may hear a message (shown in box 69 which may be chosen among several options via a search button 71), one of which indicates that the callee will be available momentarily. This latter option enables a user of portable intelligent communications device 10 to excuse himself from the meeting and take the call within a designated time period. Further, a bubble 66 is provided so that alarms such as an audible ring may be disabled to further prevent interruption during the meeting or appointment.

It will be appreciated that display screen 54 may be the first in a series of display screens for configuring various settings associated with the operational mode. Accordingly, separate control buttons 68, 70, and 72, respectively, may be provided along a bottom area of display screen 54 in order to manipulate forward and backward among the display screen series or to cancel the configuration of the meeting mode.

FIG. 5B depicts a graphical user interface in the form of a screen display 74 where settings pertaining to the work area are configured. It will be seen that this permits the user to choose between standard settings in bubble 76 and special settings in bubble 78. If special settings for the work area is chosen, a separate area 80 for choosing work area color in terms of background and foreground color is provided, as well as a separate area 82 for choosing work area font in terms of font style and size. Once this is accomplished, the user may activate one of control buttons 84, 86, and 88 again located along a lower portion of screen display 74 having the designations "Next" (in order to move to screen display 90 depicted in FIG. 5C), "Back" (in order to return to screen display 54 of FIG. 5A), and "Cancel" (in order to cancel configuration of settings for the operational mode).

FIG. 5C then shows screen display 90 where certain power settings for portable intelligent communications device 10 under the meeting mode are provided. These options include: a designated area 92 containing a bubble 94 for automatic shutdown after a designated number of seconds in a box 96; a designated area 98 for certain optional settings of an IrDA port provided by bubbles 100, 102, and 104; a designated area 106 for certain optional settings of a keyboard provided by bubbles 108, 110, and 112; a designated area 114 for certain optional settings of processing circuit 26 provided by bubbles 116 and 118; a designated area 120 for certain optional settings of battery charging provided by bubbles 122, 124, and 126; a designated area 128 for certain optional settings relating to the touch response of display screen 22 provided by bubbles 130, 132, and 134; and a designated area 136 for certain optional settings relating to backlight of display screen 22 provided by bubbles 138 and 140. It will further be seen then that a Finish control button 142, a Back control button 144, and a Cancel control button 146 are provided at a lower portion of screen display 90 in order to complete the configuration settings for the operational mode, return to screen display 74 for work area changes as seen in FIG. 5B, or cancel the operational mode settings, respectively.

Of course, some indication may be given on display screen 22 of portable intelligent communications device 10 of the status for the operational mode described herein (e.g., in status bar 57 of screen display 54 as described above). As discussed herein, activation of the operational mode may be accomplished easily through graphical user interfaces and automatically through other software applications. When done automatically, one advantage is that the operational mode will automatically be deactivated upon completion of the appointment or meeting so that subsequent inbound communications will not be diverted or lost.

Figure 6:
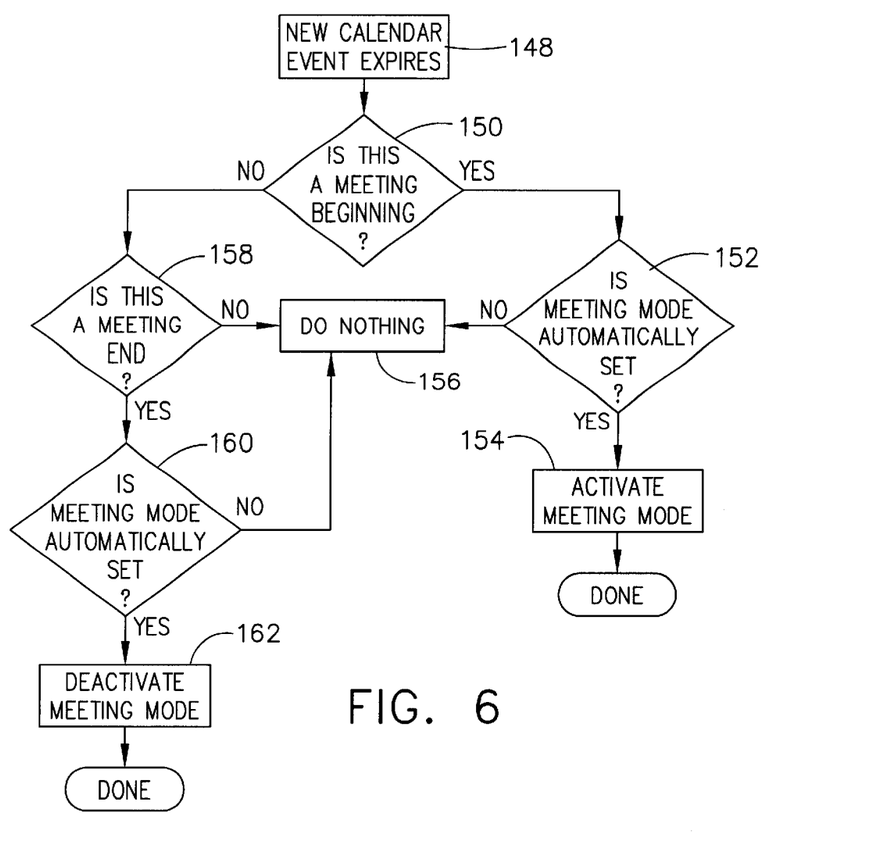
FIG. 6 is a flow diagram of the process steps taken by which the method of the present invention is accomplished.

In order to better disclose how automatic activation of the operational mode for meetings or other similar activities is intended to be implemented, FIG. 6 is a flow chart illustrating the steps undertaken in conjunction with an appointment scheduled within calendar/to do list software application 48. As seen therein, the logic of software application 48 first determines that a new calendar event has expired (box 148). A calendar event, for purposes of the current invention, involves a block of time designated in work area 61 of screen display 54. After this has occurred, the logic determines whether a meeting beginning has occurred (decision box 150). If a meeting beginning has occurred, the software application then determines whether automatic activation of the operational mode for a meeting has been set (decision box 152). Provided automatic activation of the meeting mode has been set, the meeting mode is then activated (box 154); otherwise, the software application does nothing (box 156).

If it is determined that a meeting beginning has not occurred (see decision box 150), then the software application determines whether a meeting end has occurred (decision box 158). When a meeting end has not occurred, the software application does nothing (box 156). When a meeting end has been deemed to occur, the software logic then determines whether automatic activation of the operational mode for a meeting has been set (decision box 160). As noted above with respect to when a meeting beginning has occurred, the software logic does nothing if the meeting mode is not set for automatic activation (box 156). If, however, automatic activation of the meeting mode has been set, the software then deactivates the meeting mode (box 162). Accordingly, calendar/to do list software application 48 is able to interface with the meeting mode so as to automatically activate and deactivate it when a meeting a scheduled therein.

Having shown and described the preferred embodiment of the present invention with particular reference to the drawings, further adaptations of the apparatus and method for activating an operational mode having certain configured settings for a portable intelligent communications device during a meeting or other similar activity can be accomplished by appropriate modifications by one of ordinary skill in the art without departing from the scope of the invention.

What is claimed is:

1. A method of configuring a portable intelligent communications device so as to operate in a predetermined manner when a user of said portable intelligent communications device is engaged in a meeting, said method comprising the following steps:

(a) storing in memory designated settings for a specified feature of said portable intelligent communications device;

(b) associating said designated settings with a meeting mode of operation for said portable intelligent communications device;

(c) manually initiating said meeting mode for said portable intelligent communications device by operating a control button in a graphical user interface; and (d) automatically implementing said designated settings for said specified feature of said portable intelligent communications device.

2. The method of claim 1, further comprising the step of manually terminating said meeting mode by operating a control button in a graphical user interface, wherein said designated settings for said specified feature of said portable intelligent communications device are automatically terminated.

3. The method of claim 1, wherein said designated settings are stored via a graphical user interface after initiation of said meeting mode.

4. The method of claim 1, further comprising the step of incorporating said control button in an application software program run on said portable intelligent communication device.

5. A portable intelligent communications device, comprising:

(a) circuitry for performing telephony operations;

(b) a processing circuit;

(c) a display screen coupled to said processing circuit;

(d) a first graphical user interface for storing a plurality of designated settings of a specified feature associated with a meeting mode of operation for said portable intelligent communications device; and (e) a control button in a second graphical user interface for initiating and terminating said meeting mode manually; wherein said processing circuit is operable to initiate and terminate said designated settings of said meeting mode upon activation and deactivation of said control button.

6. The portable intelligent communications device of claim 5, wherein said designated settings are stored via said first graphical user interface prior to initiation of said meeting mode.

7. The portable intelligent communications device of claim 5, further comprising a screen display depicted on said display screen for indicating a status of said meeting mode.

8. The portable intelligent communications device of claim 5, said specified feature comprising handling of inbound communications to said portable intelligent communications device.

9. The portable intelligent communications device of claim 5, said specified feature comprising handling of alarms within said portable intelligent communications device.

10. The portable intelligent communications device of claim 5, said specified feature comprising handling of power management for said portable intelligent communications device.

11. The portable intelligent communications device of claim 5, said specified feature comprising set up of a work area on a display screen for said portable intelligent communications device.

12. The portable intelligent communications device of claim 5, wherein said control button is incorporated into an application software program of said portable intelligent communications device.

* * * * *